UNITED STATES PATENT OFFICE.

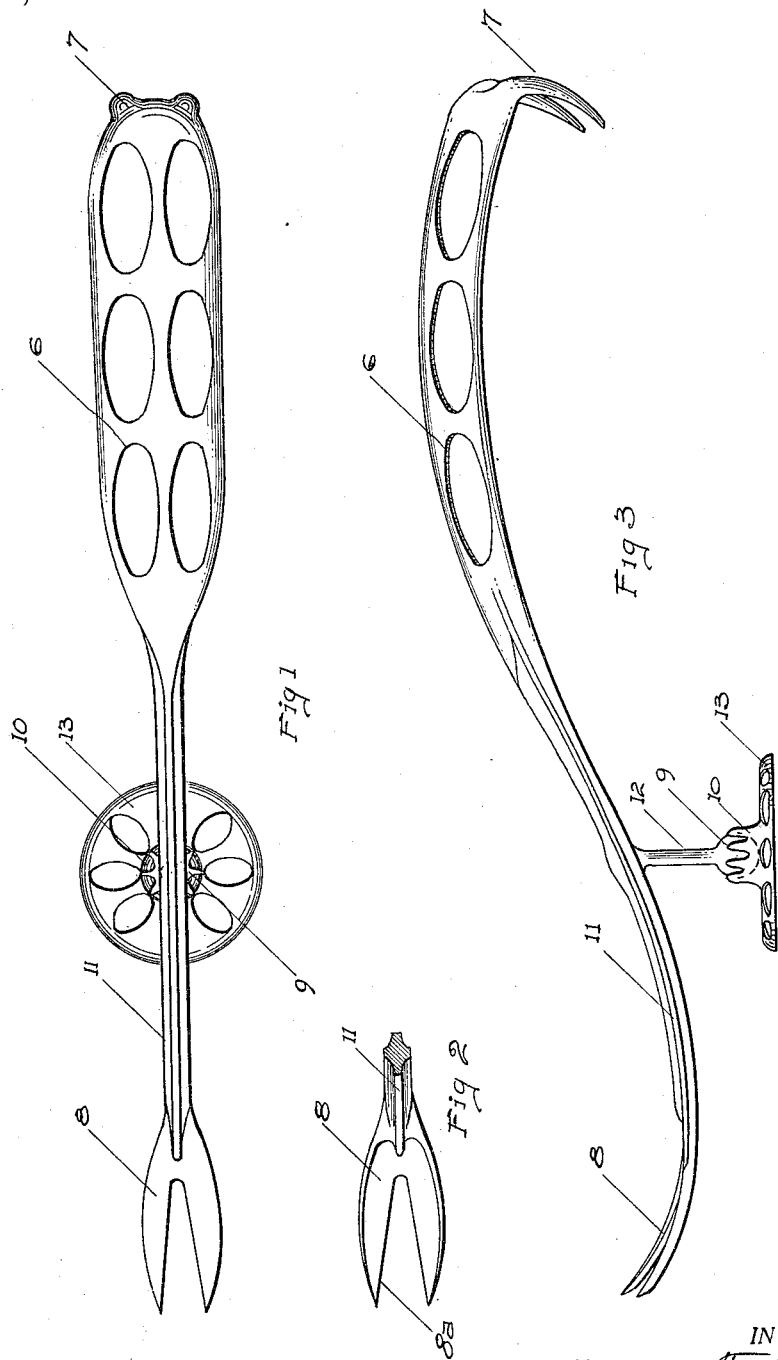

WILLIAM F. STUART, OF CLEVELAND, OHIO.

WEEDING-TOOL.

1,170,122.  Specification of Letters Patent.  Patented Feb. 1, 1916.

Application filed August 3, 1915. Serial No. 43,416.

*To all whom it may concern:*

Be it known that I, WILLIAM F. STUART, citizen of the United States, residing at Cleveland, in the county of Cuyahoga and State of Ohio, have invented certain new and useful Improvements in Weeding-Tools, of which the following is a specification.

This invention is a weeding tool, particularly serviceable for pulling dandelions, coarse grass, and weeds generally.

The tool is of the compound type, including a handle or shank with a weeding fork at one end, and a grass pulling claw at the other end, with a fulcrum mounting enabling the weeder to be easily used on turf or soft ground, the object being to provide a convenient and easily operated device of the kind.

In the accompanying drawings—Figure 1 is a plan view of the tool. Fig. 2 is a detail showing the under side of the weeding fork. Fig. 3 is a perspective view of the tool.

Referring specifically to the drawings, 11 indicates a shank provided with a handle 6 at one end and a fork 8 at the other end. The branches of the fork are somewhat dished on the under side, as shown in Fig. 2, and form a V slot with relatively sharp edges 8$^a$. Claws 7 are provided at the rear of the handle, for hooking and pulling up crab grass and the like.

The shank 11 has on its lower side a projecting arm 12 terminating in a ball 9 which fits in a socket 10 on a fulcrum plate 13 which is flat on the under side and covers enough ground to prevent it being driven into the ground by the lever pressure. The edges 8$^a$ of the fork are somewhat sharp, but not necessarily enough to cut the roots of the weeds, the intended action being to grip the root of the weed and lift the same without cutting, so as to pull the weed, root and all.

In use the fork is pushed down beside the weed, and by turning the tool on the fulcrum the weed is pulled without destroying the sod. The handle 6 and the rounded outside part of the claws 7 enable the tool to be pushed in the ground by hand pressure. To pull wire grass the tool is reversed and the claws 7 hooked into the grass, the arm 12 forming a projection for the hand to pull against. The socket 10 is conveniently made by cutting notches in the rim, forming tongues which are bent over on the ball 9 to hold the same.

What I claim as new is:

1. A weeder comprising a handle and shank, and a fork at the front end of the shank, an arm projecting from the shank and provided with a ball, and a flat fulcrum plate having a retaining socket for the ball.

2. A weeding tool comprising a handle and shank provided with a fork at one end and a hooked claw at the opposite end, an arm projecting from the shank, a fulcrum plate, and a ball and socket joint between said arm and the plate.

In testimony whereof, I affix my signature in presence of two witnesses.

WILLIAM F. STUART.

Witnesses:
JOHN A. BOMMHARDT,
J. B. DAVIS.